S. RICHARDS.
Horse Power.
No. 3,322.
Patented Oct. 28, 1843.
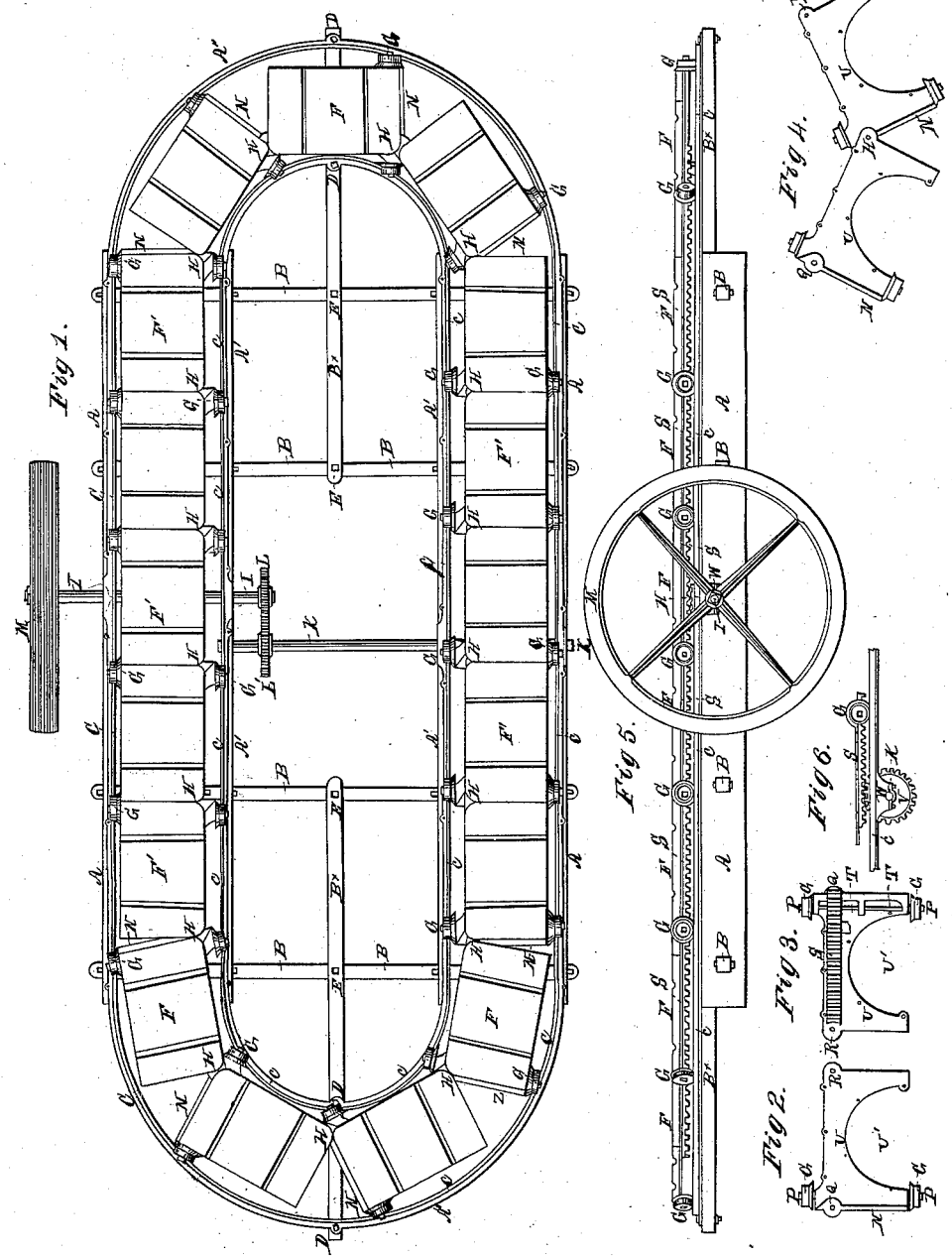

UNITED STATES PATENT OFFICE.

SALMON RICHARDS, OF POULTNEY, VERMONT.

ENDLESS-CHAIN HORSE-POWER.

Specification of Letters Patent No. 3,322, dated October 28, 1843.

*To all whom it may concern:*

Be it known that I, SALMON RICHARDS, of Poultney, in the county of Rutland and State of Vermont, have made a new and useful Improvement in the Manner of Constructing a Horizontal Railway Horse-Power; and I do hereby declare that the following is a full and exact description thereof.

The horse power which I am about to describe is, in its general construction, similar to that patented by Levi Rice and Daniel Cogdon, under date of the 17th of July 1837; but I have made a new and useful improvement in the manner of connecting combining and sustaining the respective segments upon which the horses are to walk, and which by their union constitute the horizontal revolving platform.

In the accompanying drawing Figure 1 is a plan, or top view of the machine, and Fig. 5, a side view thereof.

A, A, A′ A′ represent the side pieces of the frame which may be connected together by framing into them the cross ties B, B.

B$^x$, B$^x$ represent longitudinal pieces which extend out so as to support the circular end A″, A″, which constitute a part of the railway C C, upon which the platform F F is to run. The pieces B$^x$, B$^x$, are shown as bolted to these circular ends at D, D. The frame, however, may be put together in any other way which affords sufficient strength.

The following is the manner in which I form and combine the respective segments which constitute the platform F F. Fig. 2, shows the upper, and Fig. 3, the under side of a metallic plate U, upon which the wooden floor F, is to be placed. These plates are cut away at U′, to diminish their weight. T, is an axle upon which the wheels G, that run upon the railway, are placed. To each of the segments of the platform there is but one pair of wheels, said wheels serving to sustain not only the segment upon which they are placed, but one end also of that to which it is connected. The segments are united by a rule joint, shown at Q and R, Figs. 2 and 3. Two of them are shown as connected by a joint pin H in Fig. 4. At N, there is a ledge extending along the edge of each segment on its underside, and when the segments enter upon the straight part of the platform F′, F′, the rear end of the adjoining segment rests upon this ledge, so that the wheels G G, become the common support of both in that part where the weight of the horses is to be sustained; on the circular portions of the railway the weight of the segments only is to be supported.

To communicate motion from this horse power toothed racks S, are attached to the under sides of the plates U, near their inner edges, and these mesh into a cogwheel V, Fig. 6, on a shaft I; M, is a fly wheel on the outer end of said shaft and L, a cogwheel on its inner end, which meshes into a cogwheel L′, on the shaft K, which runs in bearings W, affixed to the side pieces A, A. From either of these shafts the power may be communicated to any machinery, by means of belts, or other gearing. It will be manifest that such a machine may be made for three or more horses by varying the form of the frame work, but for most purposes two will be sufficient.

Having thus fully described the nature of my improvements on the horizontal railway, horse power, I do hereby declare that I do not claim to be the first inventor of the manner of employing two or more horses on a horizontal revolving platform, operating upon the general plan of that herein described; but

What I do claim as my improvement therein, and desire to secure by Letters Patent is—

The within described manner of forming, and connecting together, the segments which constitute the horizontal floor, said segments each carrying one pair of bearing wheels, and the whole being connected together by hinge, or rule joints, and being furnished with ledges N, to support the contiguous segments; the whole being formed substantially in the manner herein set forth.

SALMON RICHARDS.

Witnesses:
 THOS. P. JONES,
 EDWIN L. BRUNDAGE.